United States Patent [19]

Wadland

[11] 4,344,626
[45] Aug. 17, 1982

[54] BOARD GAME FOR FORMING ALPHABETIC SYMBOLS

[76] Inventor: Mary J. Wadland, 635 Maple Ave., Downers Grove, Ill. 60515

[21] Appl. No.: 176,817

[22] Filed: Aug. 11, 1980

[51] Int. Cl.$^3$ .............................. A63F 3/00; G09B 1/40
[52] U.S. Cl. ..................... 273/243; 273/288; 434/160; 434/170
[58] Field of Search ............... 273/243, 248, 249, 276, 273/288; 434/160, 170

[56] References Cited

U.S. PATENT DOCUMENTS 2,682,118  6/1954  Larsen .................................. 434/160

FOREIGN PATENT DOCUMENTS 157563   1/1921  United Kingdom ................ 434/160
700095  11/1953  United Kingdom ................ 434/160

OTHER PUBLICATIONS

"Alphabet Game", Cleo Learning Aids Catalog, p. 172.

Primary Examiner—Anton O. Oechsle
Attorney, Agent, or Firm—Edward D. Manzo

[57] ABSTRACT

A game to teach children alphanumeric symbols uses a game board having a main course. Positions on such main course bear indicia entitling a player to obtain a playing piece called a symbol component piece. Various shapes of symbol component pieces are provided and can be combined in multiple fashions to form alphanumeric symbols. A reference board prescribes, by a physical lay-out to educate young children, the specific manners in which the several symbols may be formed. The use of colors and a color chart assists young children in learning to identify colors.

5 Claims, 6 Drawing Figures

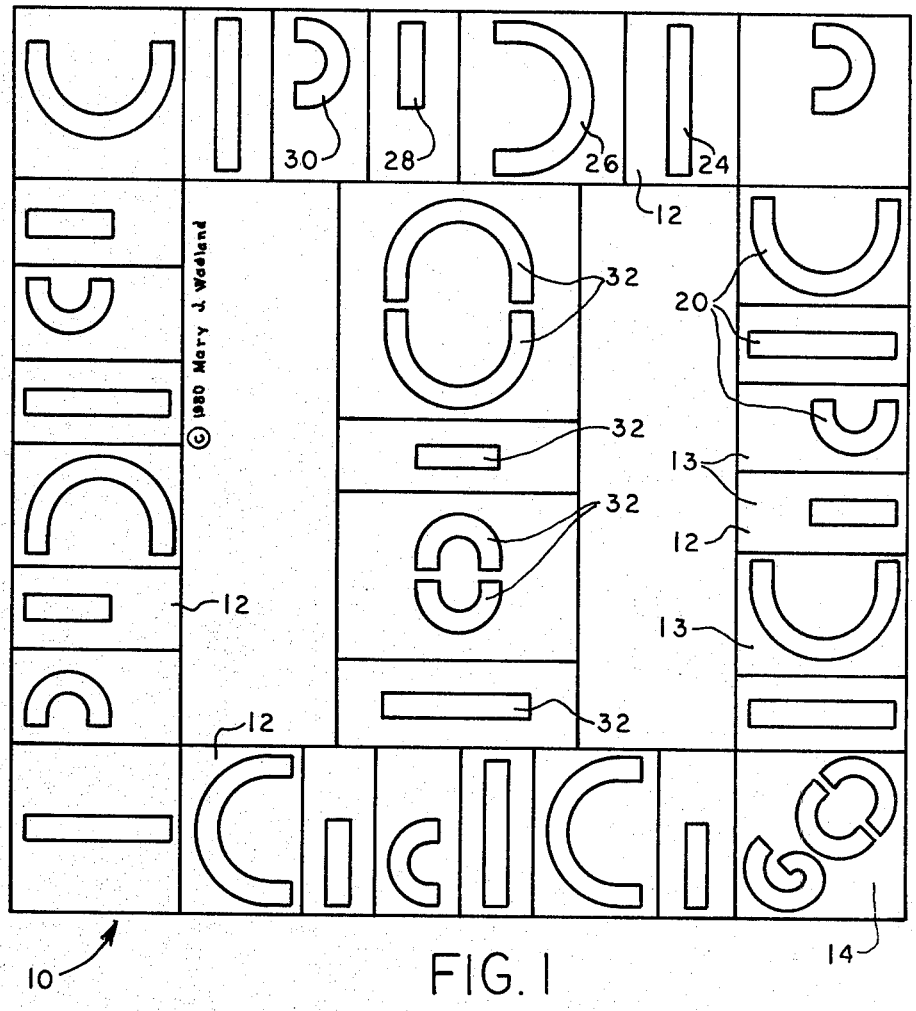
FIG. 1
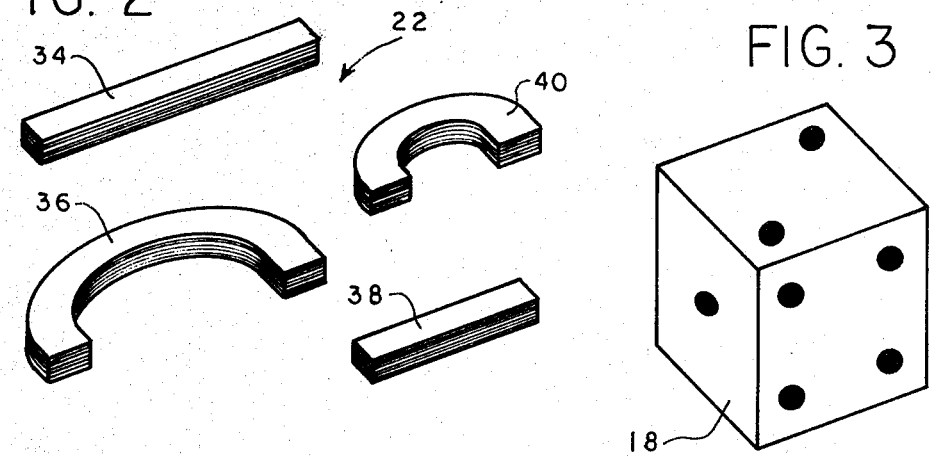
FIG. 2
FIG. 3

BOARD GAME FOR FORMING ALPHABETIC SYMBOLS

BACKGROUND OF THE INVENTION

The present invention relates to educational games and, in its preferred mode, has particular applicability to board games.

Young children ordinarily learn the alpha-numeric system by rote. As is well known, children react poorly to this type of learning. It is one object of the present invention to provide an apparatus which stimulates interest in young children to learn the alphabetic and/or numeric systems.

Another object is to provide an apparatus to teach young children the alphabetic or numeric system which makes learning fun, challenging, and creative.

A further object of the present invention is to provide an apparatus for showing young children how the letters of the alphabet and/or the digits used in the decimal system are structured, but without the use of any writing instruments, or other sharp or potentially dangerous objects.

Still another object of the present game after the basic structure of the alphanumeric system is acquired is to provide an apparatus which is fun to play, may have varied game rules for different ages, and which stimulates interest in creating letters of the alphabet and combining such letters into words, thus enabling children to learn to spell, practice addition in scoring and learning strategy with each move to achieve the highest score.

SUMMARY OF THE INVENTION

The foregoing and other objects are achieved by providing an apparatus wherein the letters of the alphabet and the ten digits have been fractionalized into symbol components such as, for instance, short lines, long lines, small semicircles and large semicircles. Playing of the game is facilitated in the illustrative embodiment by use of a game board having a main course formed by a set of board positions, each having an indication thereon of one or more of the symbol components. Each player is assigned a player marker, and movement of the player markers about the main course is determined by a die or other chance device.

A plurality of playing pieces called symbol component pieces is provided. The symbol component pieces correspond to the abstract symbol components into which the alphanumeric symbols have been fractionalized. As the player moves his marker along the course, he draws symbol component pieces corresponding to the symbol components indicated on the board position.

After an arbitrary time, such as when one type of symbol component piece is exhausted or after a predetermined time, each player organizes his symbol component pieces into any of several prescribed symbols. To show young children what the alphanumeric symbols look like and how they are formed, a reference chart or board is provided which illustrates how to combine selected symbol component pieces into symbols. At a somewhat higher level of play, players can attempt to organize their respective symbol component pieces into numbers or letters and, further, into words.

Scoring may be determined by the number of symbol component pieces formed into letters or numbers, and at the higher level of play, bonus points can be awarded for the formation of words. Still further bonus points are added for the formation of particular words, such as any word comprising the title of the game.

Each of the symbol components, in a preferred embodiment, bear a color. Bonus points are added for the formation of symbols and/or words formed entirely of one color. A neutral or blank color is provided so that the symbol component piece can be used to form any symbol while preserving the color consistency of that symbol.

To assist youngsters in learning to identify color, in the illustrative embodiment a color chart is provided having as many different unique symbols as there are colors among the symbol component pieces. Each such symbol comprises colored indicia conforming in size and shape to certain symbol component pieces. Each symbol has a unique color. The youngster will select symbol component pieces conforming in shape, size and color to a symbol on the color chart and place those symbol component pieces upon the indicia thereby to form the indicated symbol. A more knowledgeable person will identify the color of the symbol which the youngster has just formed. The youngster will then have an association of the color with a certain symbol of a given size and shape and, most importantly, of the particular color.

BRIEF DESCRIPTION OF THE DRAWINGS

In describing a preferred embodiment of the invention, reference is made to the appended drawings wherein:

FIG. 1 shows a game board useful in playing an illustrative embodiment of the invented game;

FIG. 2 illustrates four groups of symbol component pieces used in playing the game of FIG. 1;

FIG. 3 illustrates one means for determining player marker movement;

DETAILED DESCRIPTION OF THE INVENTION

Figure 4A:
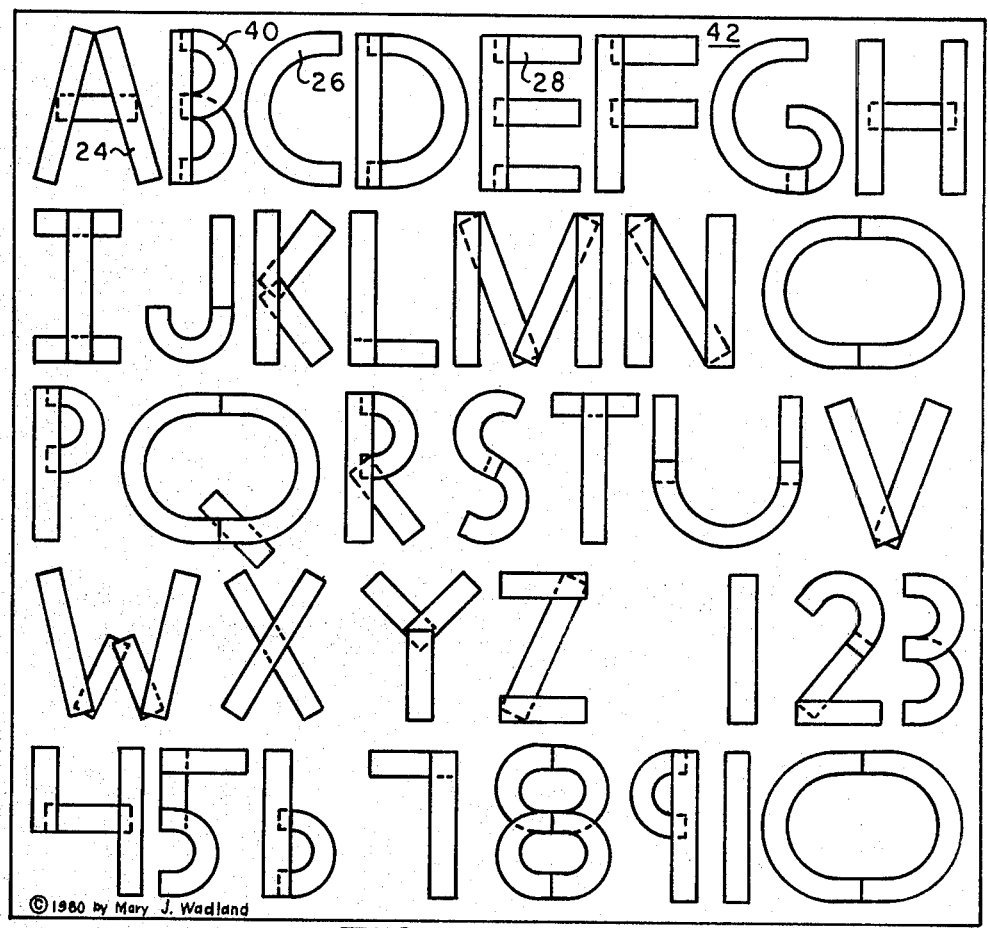
FIG. 4A shows an illustrative reference board prescribing the manner in which the symbol component pieces may be combined into symbols.

FIG. 1 illustrates a game board 10 having a main course 12 around its periphery. Main course 12 is formed by a plurality of discrete board positions 13. Advantageously, one of the corners of board 10 indicates a starting position 14 at which each player can place a player marker at the beginning of the game. Movement of the player markers about the main course 12 is determined by a means for determining player marker movement, such as a die 18. It will be understood, of course, that any one of several types of chance devices can be used for this purpose, such as a die or dice, a small roulette wheel, a deck of cards each indicating a number of spaces to advance or retreat, or other type of chance device.

As mentioned, alphanumeric symbols in the present game are formed by each player combining symbol component pieces in prescribed ways. One manner in which symbol component pieces are acquired is that the game board 10 has indicia 20 thereon associating certain board positions 13 with respective types of symbol component piece 22 (shown in FIG. 2). The indicia 20 illustratively depict abstract symbol components which are similar in shape to the shapes of the symbol component pieces 22. Also, according to the preferred embodiment, the indicia 20 are of the same size as the symbol component pieces 22. Indicia 20 depict four abstract symbol components, namely, a long line 24, a large semicircle 26, a short line 28, and a small semicircle 30.

The indicia 20 need not correspond in shape to the symbol component pieces 22. Indicia 20 may indicate the symbol component pieces in other manners, such as by assigning a respective number or letter to each different shape of symbol component piece 22. However, inasmuch as some indicium must be used to designate each piece 22, it is preferable from educational and psychological points of view, and for ease of learning, that indicia 20 do correspond in shape, at least, and preferably in size as well, to pieces 22.

It will be understood that other methods and apparatus may be provided to distribute symbol component pieces 22. For example, they may be mixed randomly and then drawn from a container or dealt to each player. A game board may be used in which only some of the board positions entitle a player, whose marker advances (or retreats) to that board position, to receive a symbol component piece, while other board positions are used for other purposes. Also, various positions on the game board may include special chance instructions which must be followed such as to require the player's marker to be advanced or retreated to another position or to allow the player to take a symbol component piece of his choosing upon landing his marker on the board space "GO."

The symbol component pieces 22 correspond to abstract components of alphanumeric symbols. Illustratively, these comprise long line pieces 34, large semicircle pieces 36, short line pieces 38, and small semicircle pieces 40, but it is to be understood that other or additional shapes may be used. Conveniently, symbol component pieces 22 of similar shapes are grouped together. For this purpose, game board 10 illustratively bears further indicia 32 depicting symbol components at central positions on the board. The further indicia 32 conform in size and shape to the symbol component pieces 22, to show where each of the four groups of like pieces 34, 36, 38 and 40 should be placed.

Each player is assigned a player marker to advance around the board 10. For simplicity, each player may use a respective, distinctive piece 22 as his marker. Of course, other types of markers, such as colored pieces or different shaped items or the like may be used.

When a player advances his marker to a position 13 bearing an indicium 20, he draws a corresponding symbol component piece 34, 36, 38 or 40 from the central position on board 10. The game progresses until an arbitrary point, which can be the exhaustion of any one or all of the groups of symbol component pieces 22 or can be a predesignated time duration of play. At this point, each player will have a collection of symbol component pieces 22 of differing shapes. The game next enters a symbol formation phase wherein each player attempts to organize his symbol component pieces 22 into any of various prescribed symbols. Formation of symbols may take place during the game as the players collect pieces 22.

FIG. 4A shows a reference item in the form of a reference chart or board 42 bearing indicia thereon. As can be seen, the indicia depict an alphanumeric set of symbols. In the preferred embodiment, such symbols are formed only of various combinations of long lines 24, large semicircles 26, short lines 28 and small semicircles 40.

Figure 4B:
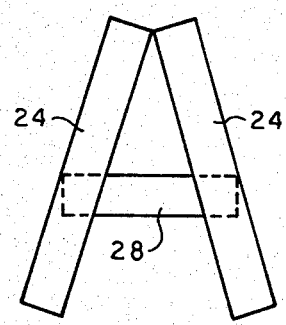
FIG. 4B is an enlarged view of the symbol "A" from the board of FIG. 4A showing how it may be formed of symbol component pieces.

FIG. 4B illustrates in an enlarged format the symbol "A" of reference board 42. As can be seen, the symbol "A" is formed of two long lines 24 and one short line 28. A youngster playing the game can use reference board 42 for assistance in forming the prescribed symbols by placing his symbol component pieces 22 upon an indicia of reference board 42 until he completes a prescribed symbol.

After the step of symbol formation, the play will be scored by counting the number of symbol component pieces 22 each player has employed to form prescribed symbols. The player with the highest score wins.

The game can be increased in level of complexity by the introduction of color. Some or all of the symbol component pieces 22 may be colored on one side. Among the group of, for instance, long line pieces 34, will be pieces which are blue, pink, yellow and green, for instance. The colored sides will be placed face down when the long line pieces 34 are placed in their central position on board 10. Hence, when players draw long line pieces 34, they will collect pieces of differing colors. In the next phase of play, formation of symbols entirely of one color will entitle the player to bonus points for that particular symbol. Another option which can be added to this is the denomination of a particular color or another indication which will be deemed to match all other colors in the formation of symbols.

Another level of complexity which may be added is the addition of further bonus points for the formation of words by the various symbols. It will be understood that because the player, upon entering the symbol formation phase of play, has a collection of many different symbol component pieces 22, he may form virtually any letter desired and then attempt to form a word, consistently, of course, with the objective of attempting to use as many symbol component pieces 22 as he has collected during the piece collection phase. Bonus points may be added in accordance with selected parameters of words which are formed. For example, extra points may be added for a word or only for each word formed of more than three characters. Further bonus points may be added for the formation of any of the words comprising the title of the game, namely, "Sticks," "Circles," or "Colors."

To facilitate scoring, a score sheet may be provided having several rows for players' names and different columns for various categories of scoring. TABLE I illustrates a score sheet which shows the scores of an illustrative player, Al.

TABLE I

| Name | Letters 1 Pt. | Numbers 1 Pt. | Words 4 Pts | Bonus Words 10 Pts | No Color Pieces 3 Pts | All 1 Color Symbols 1 Pt. | Total Score |
|---|---|---|---|---|---|---|---|
| Al | 17 | 2 | 4 | 10 | 9 | 4 | 46 |

During the piece collecting phase of the game, Al, the winner, received three pieces 22 having no color, for which he earns nine points. He formed seventeen letters and two numbers, for which he earns equal numbers of points. He formed one word to earn four points. His word was "Sticks," a bonus word, for which he earns ten points. Four of his symbols used all one color, for which he earns four points. His total score is forty-six.

It will be appreciated that the game as heretofore described is a great assistance in teaching the alphabet and the several numbers of the decimal system. Youngsters will enthusiastically join in the competition to physically form the alphanumeric symbols prescribed by the reference board 42 and will therefore have a concrete, physical model associated with each symbol. By playing the game, youngsters will be motivated to learn the alphabet and the ten digits quickly and at an early age, and without the use of any writing instruments.

Figure 5:
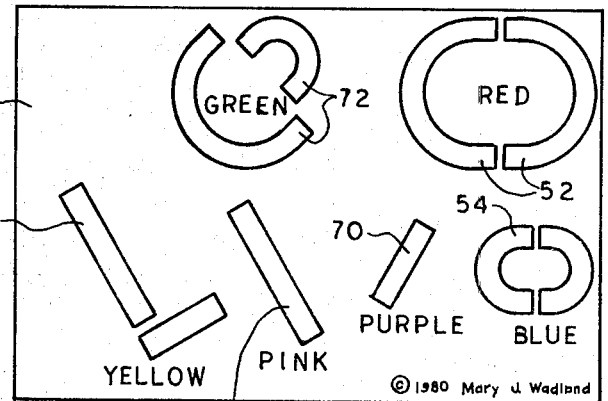
FIG. 5 illustrates a color board which is optionally provided to associate shapes with colors.

The fractionalization of the alphanumeric symbols together with the use of color for differing symbol component pieces 22 also provides a unique opportunity for teaching very young children different colors. In accordance with one aspect of the present invention, a color chart 50 may be provided as shown in FIG. 5. Color chart 50 shows different symbols in different colors. For example, chart 50 in the upper right-hand corner shows a large red oval 52. Also shown is a small blue oval 54, a yellow L 66, a pink long line 68, a purple short line 70 and a green symbol 72. These symbol indicia are formed by combinations of symbol components of certain colors. These symbol components indicia are of the same size as the symbol component pieces 22. A youngster will select symbol component pieces 22 which match the size, shape and color of the symbol components on the color chart 50 to form the various symbols indicated thereon. In this manner, the youngster will duplicate the symbol shown on the color chart and associate a symbol with each of the colors.

It will be appreciated by those who are skilled in the art that several modifications can be made to the embodiment disclosed herein consistently within the spirit of the present invention which is defined by the appended claims.

What is claimed is:

1. An educational board game apparatus for a plurality of young child players to teach them how alphabetic symbols are formed, comprising:
    a gameboard having a main course of sequential board positions for player markers;
    respective distinctive player markers for each player;
    chance means for determining player marker movement along said main course;
    a plurality of differing symbol component pieces corresponding in shape to fractionalized prescribed alphabetic symbols, symbol component pieces of the same shape being marked with differing colors;
    said main course positions having indicia thereon identifying respective component pieces;
    a reference item having indicia thereon depicting said prescribed alphabetic symbols and the manner in which said symbol component pieces may be combined into alphabetic symbols; and
    a color chart having groups of indicia thereon conforming in size and shape to said symbol component pieces, each group having a unique color substantially matching one of said differing colors of said symbol component pieces, and each group forming a symbol, whereby a player can place symbol component pieces conforming in size, shape and color upon said color chart to duplicate substantially the symbol of each color chart group, thereby to associate a color with a symbol.

2. The board game apparatus of claim 1 wherein the indicia on said gameboard positions are alphabetic symbol components.

3. The board game apparatus of claim 1 wherein said symbol component pieces represent short lines, long lines, small semicircles and large semicircles and wherein said reference item symbols include alphabetic characters, each formed by a respective arrangement of selected ones of short and long lines and small and large semicircles.

4. The board game apparatus of claim 3 wherein said reference item indicia conform in size and shape to said symbol component pieces, whereby a player may place symbol component pieces upon said reference item to assist in combining symbol component pieces into symbols.

5. The board game apparatus of claim 3 wherein the number of sequential board positions exceeds the number of differing symbol component piece shapes, and wherein respective groups of indicia representing short lines, long lines, small semicircles and large semicircles each are distributed and interspersed about said main course, whereby as a player marker is moved along said course, as determined by said chance means, indicia representing short lines, long lines, small semicircles and large semicircles will be encountered from time to time so that the player may collect from said plurality of symbol component pieces a collection in varying numbers of said fractionalized alphabetic symbols.

* * * * *